Patented Dec. 2, 1941

2,264,316

UNITED STATES PATENT OFFICE 2,264,316

COATING COMPOSITION COMPRISING CELLULOSE ETHERS

Toivo A. Kauppi and Earle L. Kropscott, Midland, Mich., assignors to The Dow Chemical Company, Midland, Mich., a corporation of Michigan No Drawing. Application March 30, 1938,
Serial No. 198,832

6 Claims. (Cl. 260—16)

This invention relates to coating compositions comprising cellulose ethers, and especially to such compositions which comprise water-insoluble alkyl ethers of cellulose, a plasticizer, and wax, and which are suitable for application from a molten condition. Such compositions are herein referred to as hot-melts.

Compositions comprising a cellulose derivative, wax, and plasticizer, with and without mutual solvents, have been employed heretofore to coat paper, cloth, metal and structureless foils. When deposited from solution, these compositions tend to retain at least traces of the solvent, are inclined to blush as a result of solvent evaporation, and do not dry readily. When sheets of material so coated are stacked one on the other and allowed to stand, with or without pressure, and even at room temperature, they are liable to stick together.

The prior art has failed to distinguish clearly between the individual adaptability of the various types of cellulose derivatives to the above type of moisture-proofing composition. In many instances, cellulose ethers, esters, and nitrate have been listed as equivalents for the purpose. Further, no distinction appears to have been made between the utility of various of the cellulose ethers in the compositions. Thus, benzyl cellulose and ethyl cellulose have been grouped as equivalents. Similarly, the art has commonly regarded various types of waxes as equivalents in the preparation of coating compositions to be applied to paper, cloth, regenerated cellulose, gelatin-foil, metal foil, and similar sheet-like material for moisture-proofing, decorative, and protective purposes. For example, the mineral waxes, such as paraffin, ceresin, and ozokerite, have been grouped together with the true ester-type waxes, of which spermaceti, montan, carnauba, and beeswax are examples. No distinction has been made between the effects of these distinct classes of materials on the properties of the composition, and it has been stated that suitable compositions can be made from "a cellulose derivative, resin, plasticizer and wax." Many hot-melt compositions comprising such ingredients are non-homogeneous or so highly viscous that they cannot be readily spread onto the material to be coated, except at temperatures which partially decompose and discolor the compositions.

It has long been desired to provide a coating composition capable of being applied to paper, cloth, foils, metals, and the like, to produce a smooth, uniform, substantially moisture-impermeable, flexible coating which is non-tacky, non-blushing, and non-"blocking." The expression "blocking" is employed in the trade to designate a condition wherein the coated sheets adhere to one another, when they are stacked together, so that they cannot be separated without pulling away part of the coating. The above-mentioned properties are preferably retained at temperatures up to as high as 60° C. and as low as —10° C., i. e. at any temperatures to which the coated article may reasonably be exposed.

In order that compositions be adapted to application from a molten condition and be suitable for coatings of the aforesaid desired type, it is necessary that several conditions be satisfied. In the first place, the melting point of the composition, and hence the minimum satisfactory temperature of application, should not be so high as to expel the moisture normally present in paper or foil to which the coating may be applied. All paper, regenerated cellulose, cloth, and the like, contains a certain amount of moisture, generally in equilibrium with the moisture content of the air. If this moisture is entirely removed from paper or the like, the paper becomes brittle and worthless for wrapping and similar purposes. If the paper is dehydrated from one side only, it not only becomes brittle but tends to warp and wrinkle. Many coatings which have been applied at temperatures substantially above 100° C. have resulted therefore in worthless, misshapen articles. The coating composition should melt at or below 100° C.

A second major consideration is the viscosity of the composition. When a hot-melt coating is applied to a sheet or foil, suitably by means of a roller which dips into a bath of the composition, it is usually distributed as uniformly as possible by means of a scraper or doctor-blade. Such coatings are not smooth enough for many purposes, and must be made more uniform before they are acceptable. To effect the desired change, it is the practice in the paper-waxing art to pass the coated paper over a hot roller, where the coating is softened enough to flow uniformly over the paper. If the coating composition has a viscosity above about 3,000 centipoises at the preferred temperature of application, i. e. not to exceed about 105° C., it will not flow enough to provide a smooth, glossy coating.

A third consideration to be kept in mind is that, in selecting operating conditions, it is necessary to avoid any prolonged heating at temperatures which will degrade or discolor any of the components of the melt. For this reason, again, temperatures not much in excess of 100° C. are preferred, and the upper limit of melting points of useful compositions is again defined. Since the desired compositions can most advantageously be applied by those firms which are familiar with the paper-waxing art, and which have apparatus available for that purpose, the composition should preferably melt and have a low viscosity at a temperature below that of low pressure steam for which paper-waxing machines are adapted. Again we find a temperature in the range from 100° to 105° to be the upper practical limit.

It is an object of the present invention to provide a coating composition which may be applied to paper, cloth, structureless foil, metal foil, and the like, without the use of volatile solvents, and at such moderate temperatures that the operation may, if desired, be carried out in standard paper-waxing apparatus. It is a further object to provide such a composition which, when applied to the aforesaid type of material, provides a thin, smooth, uniform, substantially moisture-impermeable, flexible coating which is non-tacky at ordinary temperature, non-blushing, and non-blocking, and which has no tendency to shrink, check, or to produce an "orange-peel" effect on the coated surface. It is another object to provide a coating which will retain these properties even at temperatures up to about 60° C. and as low as —10° C.

We have found that, of all the various film-forming cellulose derivatives, only the water-insoluble alkyl ethers of cellulose are adapted to produce compositions satisfying the foregoing objects with any degree of consistency, and that these may be used only within certain definite limits of concentration and intrinsic viscosity. Cellulose nitrate, cellulose esters, and aralkyl ethers of cellulose have at best only very limited compatibility with wax, or wax-resin mixtures, and cannot be substituted for the alkyl ethers of cellulose in our compositions. We have found, further, that it is not sufficient to employ any wax in the broad sense, but that true ester-type waxes and wax-like esters and alcohols, having certain minimum and maximum melting points, are essential to the composition, to provide hard, glossy coatings having a good moisture impedance. A third essential component of the final composition is a plasticizer which is a solvent for the cellulose ether, and which tends to reduce the viscosity of the cellulose ether solution in the melted wax. The plasticizer should preferably be odorless, colorless, non-toxic, and completely compatible with the other components, so that, when the composition is cooled, the plasticizer will not exude or crystallize out. The plasticizer should be used in a certain very narrow range of concentration relative to the other ingredients, so as not to leave the coating too rigid nor to make it too soft.

We prefer to add to the composition as a fourth component, a certain definite proportion and quality of a mineral wax, which serves an entirely different function from the ester-wax and cannot be substituted therefor. The mineral wax (paraffin, ozokerite, ceresin, etc.) serves as a diluent, reduces the viscosity of the "melt," and increases the moisture impedance of the composition when applied to paper, cloth, regenerated cellulose, and the like.

The above may all be considered the essential ingredients of our compositions, it being understood that for certain purposes the mineral wax may be omitted if desired, but that by so doing, the viscosity of the melt is increased somewhat and moisture impedance is reduced. A fifth component which may be employed, if desired, to produce extra gloss and hardness not provided by the wax, is a non-oxidizing, non-setting, compatible resin, either natural or synthetic. The presence of a resin materially increases the viscosity of the melt, and, if resins are used, unless restricted to very small quantities, may make impossible or decidedly difficult the application of the composition to the surface to be coated. Resins are desirable, however, when it is intended to use the coating composition as an adhesive between the sheets of multi-layer articles, as resin-containing melts are especially adapted to use as heat-sealing adhesives.

Soluble dyes or dispersed pigments may be added to the composition as coloring materials, if desired.

A water-insoluble alkyl ether of cellulose suitable for our compositions should have an upper viscosity limit of about 50 centipoises, when measured in a 5 per cent solution by weight thereof in a solvent consisting of 80 parts of toluene and 20 parts of ethanol, by volume, or 30 seconds, when measured in a 20 per cent solution in the above solvent by the falling-ball method (A. S. T. M. D301–33). The proportion of cellulose alkyl ether may range from about 5 to about 20 per cent, preferably between 5 and 15 per cent. Greater amounts of ether give too high a viscosity and too great a moisture transmission in the composition, and lesser amounts give brittle, waxy coatings.

Waxes suitable for the compositions are selected from the following groups: (a) the true waxes, i. e. the esters of high molecular weight monohydric alcohols and higher fatty acids, examples of which are spermaceti, carnauba, montan, beeswax, Japan wax, Chinese insect wax, etc.; (b) synthetic esters of polyhydric alcohols with the higher fatty acids, e. g. 12-hydroxy stearin, glycol stearate, diethylene glycol laurate, etc.; (c) high melting point fats, such as tallow (ordinarily used in conjunction with one of the other types); (d) synthetic esters of monohydric alcohols with the higher fatty acids, e. g. phenoxy ethyl stearate, lauryloxyethyl laurate, palmitic and stearic esters of the alcohols obtained by reducing palm or sperm oil fatty acids; (e) monohydric alcohols from the hydrogenation of natural oil fatty acids; and (f) monohydric alcohols from the saponification of waxes, such as myricyl alcohol, cetyl alcohol, and ceryl alcohol. As used herein, the term "ester-wax" comprises the waxes of all of the above types. The proportion of such wax should be between 30 and 80 per cent, preferably 40 to 60 per cent, of the composition. When over about 60–70 per cent of wax is used, the composition becomes brittle and characteristically "waxy." When less than about 30–40 per cent of wax is employed, the viscosity of the composition is not low enough to be satisfactorily applied as a melt. The wax should have a melting point between 40° and 100° C., and preferably between 60° and 80° C. Higher melting waxes form brittle compositions, while those with lower melting points yield tacky films which do not pass the "block" test. For some purposes the composition may advantageously contain more than one ester-wax.

A plasticizer is used which is a solvent for the cellulose ether, is compatible with the wax, and reduces the viscosity of the cellulose ether solution in wax. The plasticizer should ordinarily be colorless, odorless, and non-toxic. The proportion of plasticizer is between about 5 and about 20 per cent. Examples of suitable plasticizers include dibutyl phthalate, castor oil, glycol sebacate, alkyl phthalyl glycolates, and certain liquid aromatic phosphates, e. g. diphenyl mono-ortho-xenyl phosphate. It is preferable to keep the amount of plasticizer as low as possible, consistent with good flexibility of films produced therefrom, since, in general, the moisture impedance of such a film is decreased as the amount of plasticizer increases.

The use of mineral wax as a diluent is desirable, since it reduces the viscosity of the melt as well as increasing the moisture impedance of films thereof. The proportion of mineral wax used should be less than 50 per cent, preferably from 10 to 30 per cent of paraffin wax, etc. The ratio of mineral wax to ester- or alcohol-wax which may be employed without exceeding the compatibility limit of the cellulose ether in the composition, varies somewhat. When glyceryl 12-hydroxy stearate is used as the ester-type waxy material, paraffin can only be added up to about 0.6 part of the latter per part of the stearate.

A resin is added as an optional component when it is desired to produce certain special finishes, notably those which are especially hard and glossy. Furthermore, the use of a resin promotes adhesion to structureless foils, e. g. metal foils, cellulose acetate film, and regenerated viscose sheet. Similarly, it promotes adhesion to glassine papers and highly coated or sized, smooth-surfaced papers. Ordinarily, if a resin is to be used, it should be stable to light, difficultly oxidized, and non-setting. In no case has it been found desirable to use over 25 to 30 per cent of a resin, and ordinarily 10 to 20 per cent is all that we employ in a heat-sealing coating, such as those used in food wrappers and the like. It is to be observed that, when a resin is used, it is present in amount considerably smaller than the amount of wax employed. When more than 25 to 30 per cent resin is used, the coating has a tendency to block, if the film is flexible, because so much plasticizer is needed that the film is tacky. If the composition is not heavily plasticized, the coating is too brittle for practical purposes. It is not necessary to include resins in heat-sealing compositions if a film of about 0.001 inch thickness can be used. Resins are, however, desirable in heat-sealing films having thicknesses of 0.0002 inch, or less. Among the natural resins which may be used advantageously is damar in an un-dewaxed state. For most other uses in coating compositions, this resin must be dewaxed prior to use, but that expensive step is not necessary in the present compositions.

The entire composition, when made up of the above ingredients in the range of proportions specified, has a viscosity lower than 3,000 centipoises, when measured at a suitable temperature of application, i. e. about 105° C. When the materials are employed in the preferred range of proportions, the viscosity of the molten composition is in the preferred range of 100 to about 1,500 centipoises, the measurement being made at about 105° C.

The following compositions are illustrative of our invention as applied to a variety of uses, but are not to be construed as limiting.

EXAMPLE 1.—*Paper coating compositions*

|  | a | b |
|---|---|---|
| Ethyl cellulose (48% ethoxyl, 17 centipoise) | 10 | 12 |
| Dibutyl phthalate | 5 | 8 |
| Hydrogenated castor oil ("Opal wax") | 70 | 55 |
| Modified vegetable wax ("Albacer") |  | 15 |
| Paraffin | 15 | 10 |
| Viscosity at 105° C., centipoises | 375 | 410 |
| Moisture transmission, g./sq. meter/24 hrs | 120 | 205 |

The above compositions all produce flexible, non-blocking coatings.

EXAMPLE 2.—*Paper coating compositions (heat-sealing)*

|  | a | b | c | d |
|---|---|---|---|---|
| Ethyl cellulose (48% ethoxyl, 17 centipoise) | 10 | 10 | 10 | 10 |
| Dibutyl phthalate | 10 | 10 | 10 | 10 |
| Rosin modified alkyd resin ("Paranol 1639") | 18 | 18 | 18 | 18 |
| Paraffin | 20 | 15 | 15 | 20 |
| Ceresin |  |  | 5 | 5 |
| Hydrogenated castor oil | 42 | 47 | 52 | 37 |
| Viscosity at 105° C., centipoises | 575 | 757 | 519 | 532 |
| Moisture transmission, when spread 2 lbs. on 3,000 sq. ft. of paper, g./sq. meter/24 hrs | 88 | 130 | 74 | 52 |

By way of comparison, uncoated paper has a moisture transmission of at least 1,000 g./sq. meter/24 hrs.

EXAMPLE 3.—*Coatings for metal foil*

|  | a | b |
|---|---|---|
| Ethyl cellulose (17 centipoise) | 10 | 20 |
| "Paranol 1639" | 15 | 15 |
| Paraffin | 10 | 10 |
| Dibutyl phthalate | 10 | 10 |
| Hydrogenated castor oil | 55 | 45 |

The above coatings are easily applied at moderate temperatures to metal foil, such as aluminum, lead, tin, etc., and produce a flexible, hard, glossy, adherent finish which is non-tacky, non-blushing, and non-blocking.

EXAMPLE 4.—*Coatings for structureless foil*

|  | a On ethyl cellulose | b On Cellophane |
|---|---|---|
| Ethyl cellulose (17 centipoise) | 10 | 10 |
| Dibutyl phthalate | 5 | 10 |
| "Paranol 1639" | 10 | 15 |
| Paraffin | 17 | 10 |
| Hydrogenated castor oil | 58 | 55 |
| Moisture transmission of coated foil, containing about 2 lbs. of composition per 3,000 sq. ft., g./sq. meter/24 hrs | 35 | 35–40 |

For comparison, uncoated ethyl cellulose film has a moisture transmission of about 1,000–1,400 g./sq. meter/24 hrs., and regenerated cellulose films transmit from about 1,200 to about 2,000 g./sq. meter/24 hrs.

The above and similar coatings have been employed for coating cloth, as well as for laminating metal foil to paper and to cloth, regenerated cellulose to paper and to cloth, cloth to cloth, paper to paper, paper to cloth, and structureless cellulose derivative foils (esters, ethers, and nitrate) to paper, cloth, and metal foil.

Examples 2 to 4 all include a resin as one component of the coating composition, since these particular compositions were employed on foils or sheets which were to be heat-sealed to other sheets. As previously stated, and as shown by reference to Example 1, the omission of the resin leaves a composition of lower viscosity and ordinarily one of lower melting point, and hence, one which is more readily applied in a convenient manner, suitably in a standard paper-waxing machine.

Although we have employed water-insoluble ethyl, propyl, propyl ethyl, methyl ethyl, and butyl cellulose, all of which are satisfactory in our compositions, we prefer to employ "standard" ethyl cellulose (about 47-49% ethoxyl) as the cellulose ether. Of the various waxes employed, we prefer glyceryl tri-(12-hydroxy stearate), i. e. 12-hydroxy stearin, which is a hydrogenated castor oil known to the trade as "Opal wax." This material, which is substantially insoluble in all common cellulose ether solvents and can not be used in the solutions employed for the present purpose in the prior art, is compatible with cellulose ethers and readily adapted to use in a "melt" of the type herein described.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A hot-melt coating composition consisting essentially of from 70 to 100 per cent of the following named ingredients each in a proportion to constitute a percentage of the whole within the range recited below, any balance, not to exceed 30 per cent of the whole, being a rosin modified alkyd resin:

|  | Per cent by weight |
|---|---|
| Water-insoluble cellulose lower alkyl ether wherein the alkyl radicals contain from 1 to 4 carbon atoms, inclusive | 5-15 |
| A wax selected from the group consisting of true waxes, wax-like esters, and wax-like monohydric alcohols, M. P. above 40° C | 40-60 |
| A plasticizer which is a solvent for the cellulose ether | 5-15 |
| Mineral wax, M. P. above 40° C | 10-20 | the said composition having a viscosity below 3,000 centipoises when measured at 105° C., and being capable of depositing from the molten condition a non-tacky, non-blushing, flexible, non-blocking coating of high moisture impedance.

2. A hot-melt coating composition consisting essentially of the following named ingredients each in a proportion to constitute a percentage of the whole within the range recited below:

|  | Per cent by weight |
|---|---|
| Water-insoluble cellulose lower alkyl ether wherein the alkyl radicals contain from 1 to 4 carbon atoms, inclusive | 5-15 |
| A wax selected from the group consisting of true waxes, wax-like esters, and wax-like monohydric alcohols, M. P. above 40° C | 40-60 |
| A plasticizer which is a solvent for the cellulose ether | 5-15 |
| Mineral wax, M. P. above 40° C | 10-20 |
| A rosin-modified alkyd resin | 10-20 | the said composition having a viscosity below 3,000 centipoises when measured at 105° C., and being capable of depositing from the molten condition a non-tacky, non-blushing, flexible, non-blocking coating of high moisture impedance.

3. A hot-melt coating composition consisting essentially of from 70 to 100 per cent of the following named ingredients each in a proportion to constitute a percentage of the whole within the range recited below, any balance, not to exceed 30 per cent of the whole, being a rosin modified alkyd resin:

|  | Per cent by weight |
|---|---|
| Water-insoluble ethyl cellulose of viscosity less than 50 centipoises | 5-15 |
| A wax selected from the group consisting of true waxes, wax-like esters, and waxlike monohydric alcohols, M. P. 60°-80° C | 40-60 |
| A plasticizer which is a solvent for the cellulose ether | 5-15 |
| Mineral wax, M. P. above 40° C | 10-20 | the said composition having a viscosity below 3,000 centipoises when measured at 105° C., and being capable of depositing from the molten condition a non-tacky, non-blushing, flexible, non-blocking coating of high moisture impedance.

4. A hot-melt coating composition consisting essentially of from 70 to 100 per cent of the following named ingredients each in a proportion to constitute a percentage of the whole within the range recited below, any balance, not to exceed 30 per cent of the whole, being a rosin modified alkyd resin:

|  | Per cent by weight |
|---|---|
| Water-insoluble ethyl cellulose of viscosity less than 50 centipoises | 5-15 |
| 12-hydroxy stearin | 40-60 |
| A plasticizer which is a solvent for the cellulose ether | 5-15 |
| Mineral wax, M. P. above 40° C | 10-20 | the said composition having a viscosity below 3,000 centipoises when measured at 105° C., and being capable of depositing from the molten condition a non-tacky, non-blushing, flexible, non-blocking coating of high moisture impedance.

5. A hot-melt coating composition consisting essentially of the following named ingredients each in a proportion to constitute a percentage of the whole within the range recited below:

|  | Per cent by weight |
|---|---|
| Water-insoluble ethyl cellulose of viscosity less than 50 centipoises | 5-15 |
| A wax selected from the group consisting of true waxes, wax-like esters, and wax-like monohydric alcohols, M. P. 60°-80° C | 40-60 |
| A plasticizer which is a solvent for the cellulose ether | 5-15 |
| Mineral wax, M. P. above 40° C | 10-20 |
| A rosin-modified alkyd resin | 10-20 | the said composition having a viscosity below 3,000 centipoises when measured at 105° C., and being capable of depositing from the molten condition a non-tacky, non-blushing, flexible, non-blocking coating of high moisture impedance.

6. A hot-melt coating composition consisting essentially of the following named ingredients each in a proportion to constitute a percentage of the whole within the range recited below:

|  | Per cent by weight |
|---|---|
| Water-insoluble ethyl cellulose of viscosity less than 50 centipoises | 5-15 |
| 12-hydroxy stearin | 40-60 |
| A plasticizer which is a solvent for the cellulose ether | 5-15 |
| Paraffin wax, M. P. above 40° C | 10-20 |
| A rosin-modified alkyd resin | 10-20 | the said composition having a viscosity below 3,000 centipoises when measured at 105° C., and being capable of depositing from the molten condition a non-tacky, non-blushing, flexible, non-blocking coating of high moisture impedance.

TOIVO A. KAUPPI.
EARLE L. KROPSCOTT.